H. F. SCHMIDT

April 22, 1930. PUMP Re. 17,648

Original Filed March 28, 1929

Inventor
H. F. Schmidt.

A. B. Davis
Attorney

Reissued Apr. 22, 1930 Re. 17,648

UNITED STATES PATENT OFFICE

HENRY F. SCHMIDT, OF LANSDOWNE, PENNSYLVANIA, ASSIGNOR TO WESTINGHOUSE ELECTRIC & MANUFACTURING COMPANY, A CORPORATION OF PENNSYLVANIA

PUMP

Original No. 1,747,848, dated February 18, 1930, Serial No. 350,762, filed March 28, 1929. Application for reissue filed March 12, 1930. Serial No. 435,377.

My invention relates to elastic fluid devices and more particularly to blowers of the propeller type.

With propeller type blowers it is a matter of considerable convenience to be able readily to adjust or to renew the bearings and the propeller without dismantling the entire blower structure. It frequently happens that the housing of the blower, which takes the form of a tubular member having the propeller arranged therein, has its ends associated with structural members and the prime mover of the blower is also supported in place with respect to the housing and with respect to the driving shaft. Ordinarily, with a construction of this type, access is had to the propeller and to the bearings by very largely dismantling the entire construction. It is, therefore, the object of the present invention to provide an improved type of blower wherein the propeller and the bearings may be reached without dismantling the structure; and, to this end, a door is arranged at one side of the propeller of sufficient size to permit of the passage of the propeller therethrough and the outer bearing for the propeller shaft is carried by an axially movable guide vane structure. With this arrangement, when it is desired to have access either to the bearing or to the propeller, the guide vane structure is moved axially away from the propeller, thereby disengaging its bearing from the propeller shaft and then access may be had to the bearings and to the propeller through the door.

Figure 1:
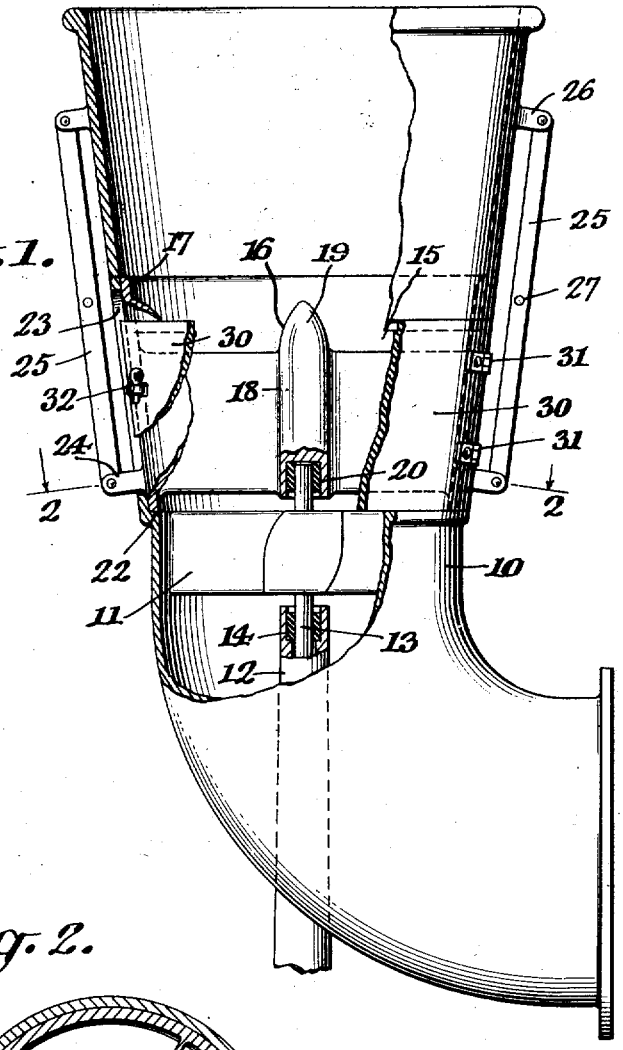
Figure 2:
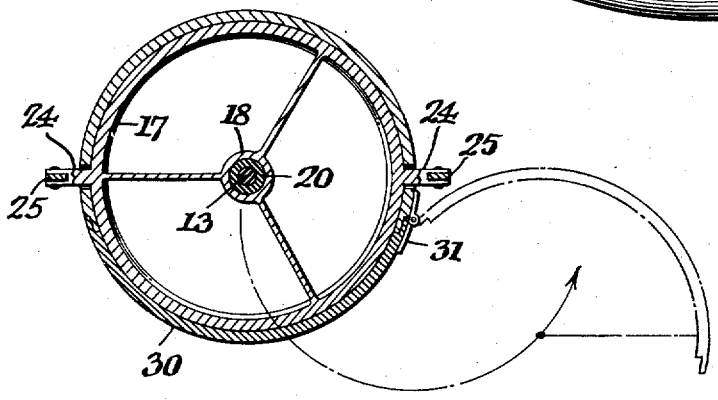

This and other objects are effected by my invention, as will be apparent from the following specification and claims taken in connection with the accompanying drawings, forming a part of this application, in which:

Fig. 1 is a view partly in section and partly in elevation showing my improved blower; and, Fig. 2 is a sectional view taken along the line II—II of Fig. 1.

Referring to the drawings now more in detail, I show a blower housing 10 having a propeller 11 arranged therein. Supporting structure 12 extends axially of and within the housing and it supports the propeller shaft 13, a bearing 14 being carried by the supporting structure and adjacent to the propeller 11.

The housing 10 is provided, at the side of the propeller 11 remote from the bearing 14, with an opening 15, which is of sufficient size to permit of the passage of the propeller therethrough. At the same side of the propeller and arranged within the housing, there is an axially-movable guide vane structure 16, the latter structure including the peripheral element 17 arranged to fit the interior of the housing 10 and a central hub portion 18 preferably terminating in a fairing cone portion 19. Adjacent to the propeller 11, the hub portions 18 is provided with a bearing 20 arranged to fit the outer end of the propeller shaft 13.

When the guide vane structure is in normal position with the bearing 20 fitting the outer end of the propeller shaft 13, the peripheral portion 17 fits a shoulder 22 provided within the housing in order to form a support for the guide vane structure and to limit movement thereof toward the propeller. In order that access may be had to the propeller through the opening 15, it is necessary that the guide vane structure 16 shall be raised. Any suitable means may be employed for this purpose so long as the guide vane structure is moved sufficiently far away from the propeller to permit of the desired access to the bearings and to the propeller and to permit the removal and replacement of these parts through the opening 15. For example, I show the housing provided with longitudinal slots 23 through which extend ears 24 provided on the guide vane structure. Bars 25 are connected to the ears and these bars may be utilized in lifting the guide vane structure. Assuming the guide vane structure is moved away from the propeller a desired distance, it may be retained in the like position, by suitable pins or other means passing through the ears 26 provided on the housing and through intermediate openings 27 provided in the bars 25.

As shown, the slots 23, as well as the opening 15, are covered by the peripheral portion 17 of the guide vane structure. However, I prefer to provide a door 30 for the opening 15, the door having suitable hinges 31 at one side and latch means 32 at the other side.

From the foregoing, it will be apparent that, when the guide vane structure 16 is moved away from the propeller and the door 30 is opened, the bearing 20 is then accessible for repair, adjustment, or renewal. The propeller may be removed from the propeller shaft 13 and taken out through the opening 15, and such propeller may be repaired or a new one inserted through the opening and secured in place with respect to the propeller shaft 13. Also, if the propeller is removed, the bearing 14 may be adjusted, repaired or renewed. All of these things may be done without dismantling any of the blower structure other than to the extent indicated. The housing structure 10 remains in place and the same is true with respect to the central-supporting structure 12 and the propeller shaft 13.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

I claim:

1. In apparatus of the character described, the combination of a housing, a propeller in the housing, guide vane means arranged in the housing and cooperating with the propeller, means providing for axial movement of the guide vane means toward and away from the propeller, said housing having an opening arranged to permit of the passage therethrough of the propeller when the guide vane means is moved away from the propeller, and means for closing said opening.

2. In apparatus of the character described, the combination of a housing, a supporting structure extending into the housing and having a bearing at its inner end; a driving shaft carried by the supporting structure and fitting said bearing; a propeller carried by the driving shaft; and guide vane structure fitting the interior of the housing, movable axially with respect to the housing, arranged at the side of the propeller opposite to said bearing, and provided with a bearing fitting the outer end of said driving shaft.

3. In apparatus of the character described, the combination of a housing, a propeller in the housing, a bearing arranged at one side of the propeller, a driving shaft fitting said bearing and extending through and beyond the propeller, guide vane means fitting the interior of the housing and provided with a bearing fitting the end portion of said driving shaft, said guide vane structure being constructed and arranged to move axially of the housing in order to engage and disengage its bearing with respect to the driving shaft, an opening provided in the housing at one side of the propeller and of such size as to provide for the passage of the propeller therethrough, and means for closing the opening.

4. In apparatus of the character described, the combination of a housing, a propeller in the housing, guide vane means arranged in the housing and cooperating with the propeller, means for normally supporting the guide vane means in fixed position adjacent to the propeller, said supporting means being arranged to afford displacement of the guide vane means within the housing in a direction away from the propeller, and means embodied in the housing for affording access to the propeller when said guide vane means is in displaced position.

In testimony whereof I have hereunto subscribed my name this eleventh day of March, 1930.

HENRY F. SCHMIDT.